United States Patent [19]

Cheng

[11] Patent Number: 5,718,399

[45] Date of Patent: Feb. 17, 1998

[54] SHOCK ABSORBING FRAME STRUCTURE OF A KITE

[76] Inventor: Chen-Nan Cheng, No. 21, Alley 7, Yun Fung Road, Tu Cheng Hsiang, Taipei Hsien, Taiwan

[21] Appl. No.: 677,422

[22] Filed: Jul. 9, 1996

[51] Int. Cl.⁶ .................................................. B64C 31/06
[52] U.S. Cl. ................................. 244/153 R; 244/155 R
[58] Field of Search ........................... 244/153 R, 155 A, 244/38, 142, 16

[56] References Cited

U.S. PATENT DOCUMENTS

| | | | |
|---|---|---|---|
| 1,108,484 | 8/1914 | Bamic | 244/142 |
| 2,757,886 | 8/1956 | Correa | 244/38 |
| 3,116,902 | 1/1964 | Gould | 244/153 R |
| 4,015,802 | 4/1977 | Heredia | 244/153 R |
| 4,150,804 | 4/1979 | Jackson | 244/153 R |
| 4,958,787 | 9/1990 | Sterling | 244/153 R |

*Primary Examiner*—Galen L. Barefoot
*Attorney, Agent, or Firm*—Morton J. Rosenberg; David I. Klein; Jun Y. Lee

[57] ABSTRACT

A shock absorbing frame structure including a frame rod having one end inserted into one pocket of the cover sheet of a kite, a sleeve sleeved onto one end of the frame rod, an end cap fixedly fastened to one end of the sleeve outside the frame rod and disposed within the pocket of the cover sheet of the kite, and spring means mounted within the sleeve and stopped between the end cap and the frame rod and adapted for absorbing shocks.

5 Claims, 5 Drawing Sheets

SHOCK ABSORBING FRAME STRUCTURE OF A KITE

BACKGROUND OF THE INVENTION

The present invention relates to kites, and relates more particularly to a shock absorbing frame structure for kites which absorbs shocks to prevent a damage to the framework of the kite when the kite falls to the ground.

A kite is generally comprised of a framework, and a cover sheet stretched on the framework. Nowadays, a variety of stunt kites have been disclosed for performing all kinds of flying stunts. Conventional kites are functional, however their frameworks tend to be damaged when they fall to the ground.

SUMMARY OF THE INVENTION

The present invention has been accomplished to provide a shock absorbing frame structure for kites which absorbs shocks to prevent a damage to the framework of the kite when the kite falls to the ground.

According to one embodiment of the present invention, the shock absorbing frame structure comprises a frame rod having one end inserted into one pocket of the cover sheet of a kite, a sleeve sleeved onto one end of the frame rod, an end cap fixedly fastened to one end of the sleeve outside the frame rod and disposed within the pocket of the cover sheet of the kite, and spring means mounted within the sleeve and stopped between the end cap and the frame rod and adapted for absorbing shocks.

DETAILED DESCRIPTION OF THE PREFERRED EMBODIMENT

Figure 1:
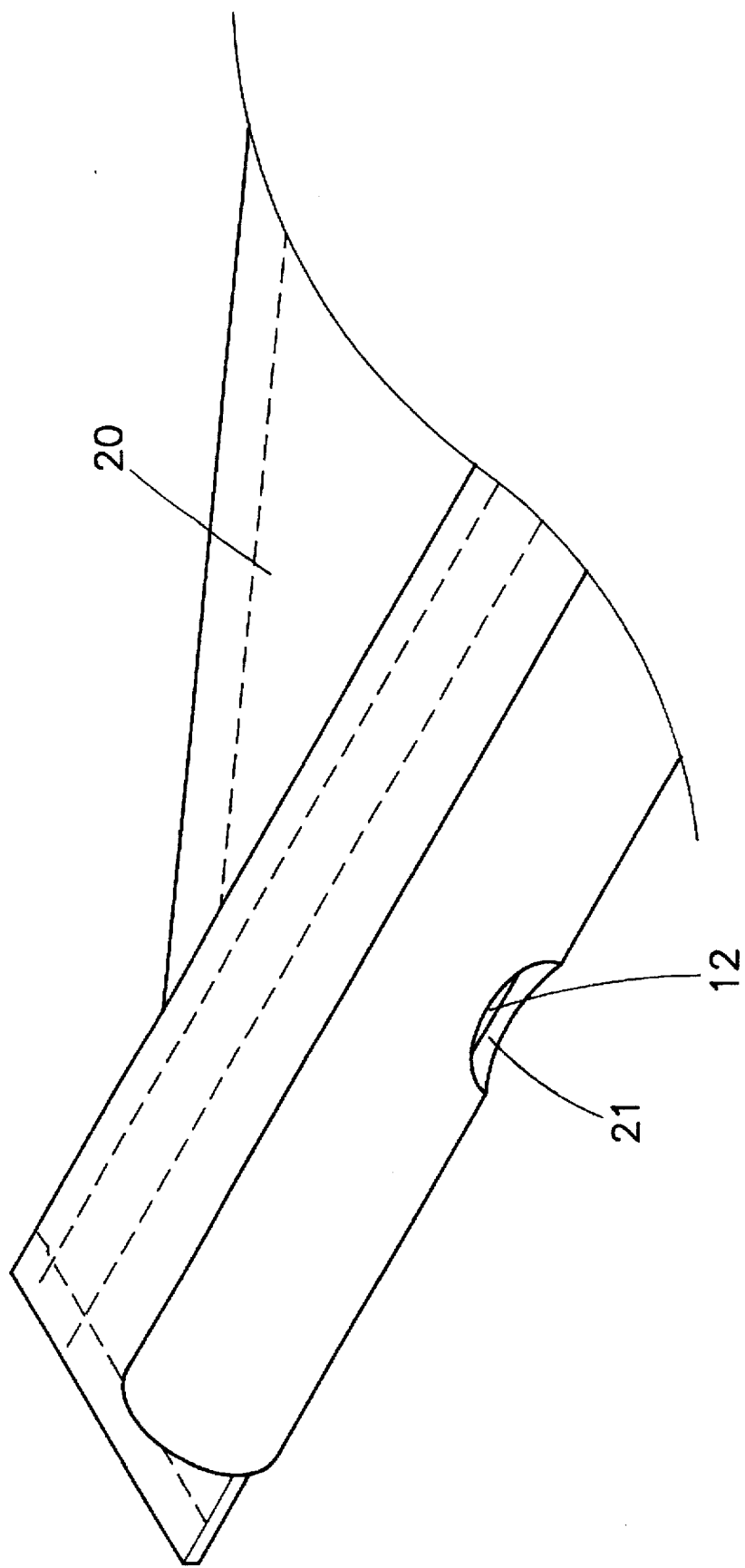
FIG. 1 is a partial view of a kite according to the present invention, showing a shock absorbing frame structure installed in one pocket of the cover sheet.
Figure 2:
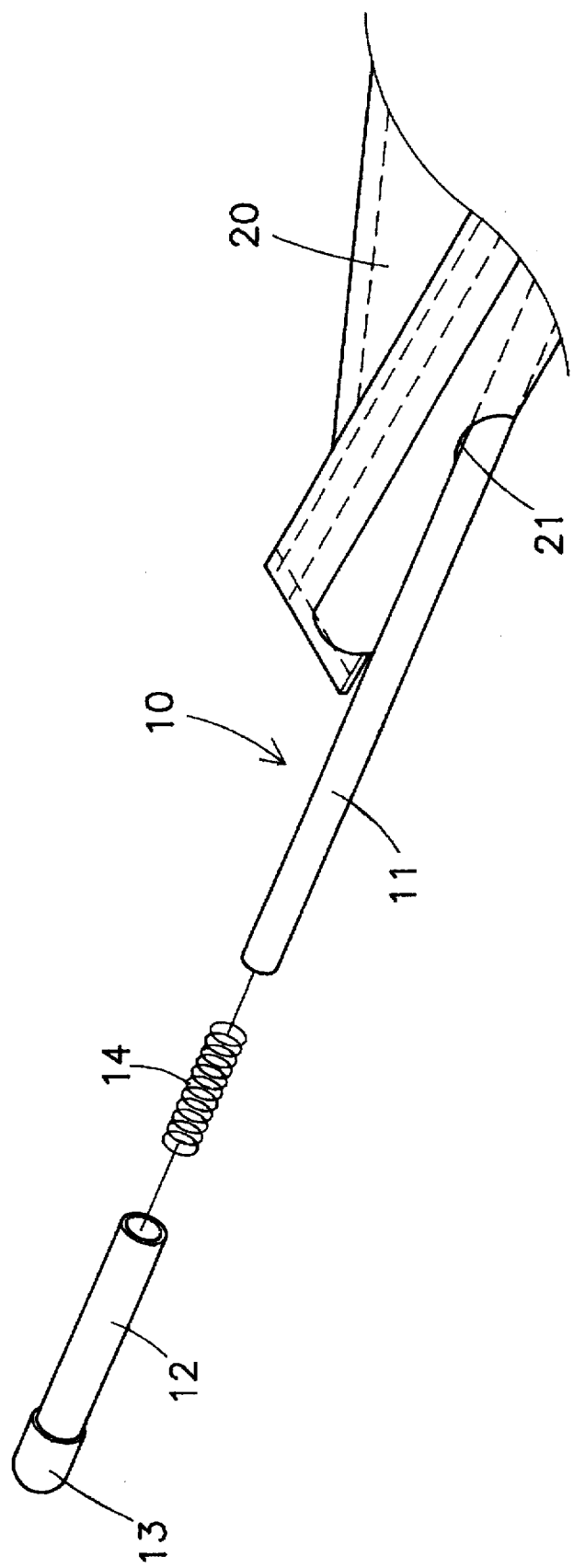
FIG. 2 is an exploded view of the shock absorbing frame structure shown in FIG. 1.
Figure 3:
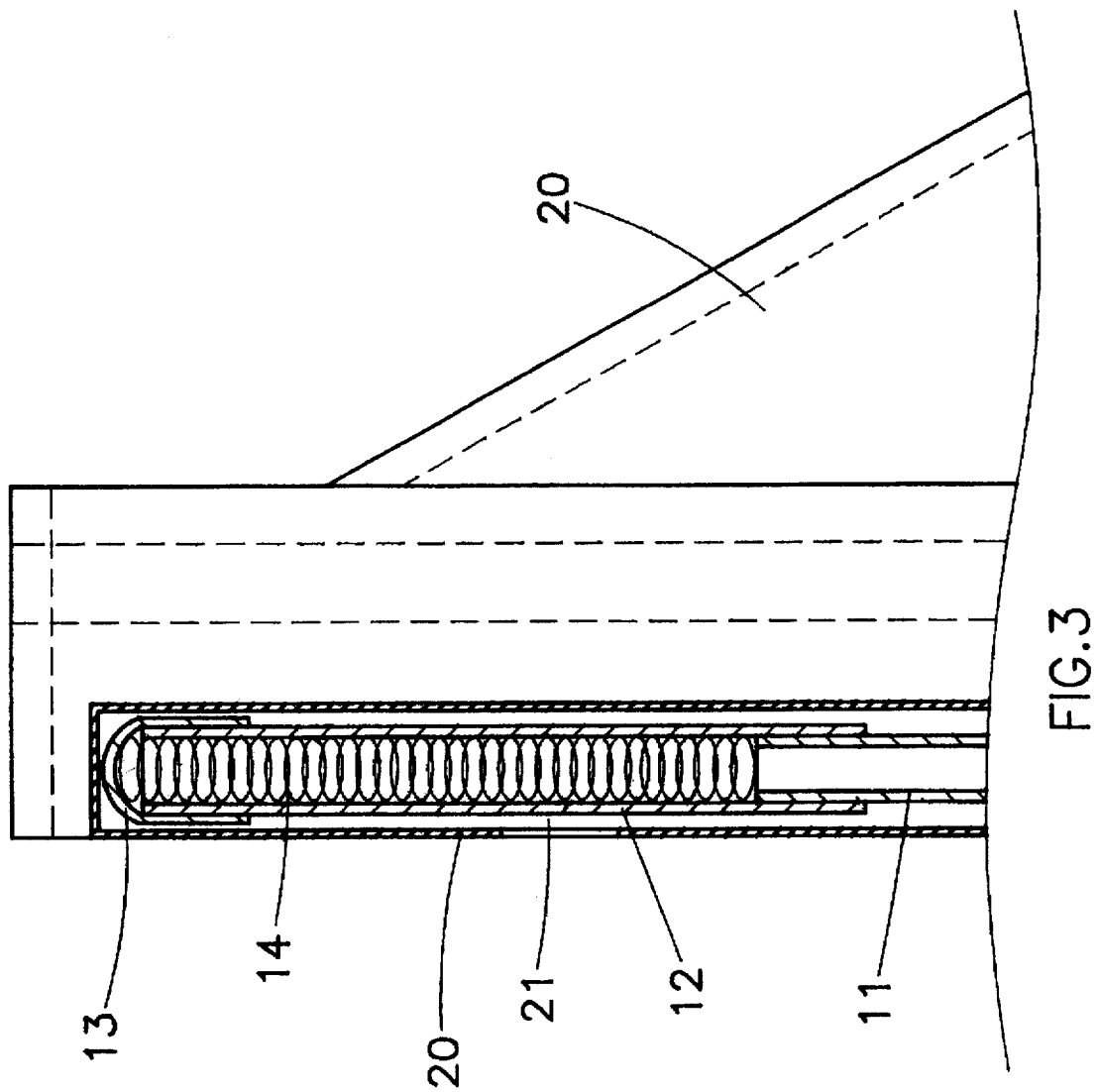
FIG. 3 is a sectional plain view of the shock absorbing frame structure shown in FIG. 1.

Referring to FIGS. 1, 2, and 3, the frame rod 11 of the frame structure 10 has at least one end mounted with an end cap 13. The end cap 13 has an elongated sleeve 12 sleeved onto one end of the frame rod 11. A spring 14 is mounted within the elongated sleeve 12 and stopped between the end cap 13 and the frame rod 11. When assembled, the spring 14 imparts an outward pressure to the end cap 13. When the frame structure 10 is fastened to the cover sheet 20, the end cap 13 is inserted in one pocket 21 of the cover sheet 20 and stopped in place. Because the spring 14 is stopped between the end cap 13 and the frame rod 11, the spring 14 is compressed to absorb shocks when the frame rod 11 is forced against an object as the kite falls to the ground. Therefore, little impact force is acted upon the frame structure of the kite.

Figure 4:
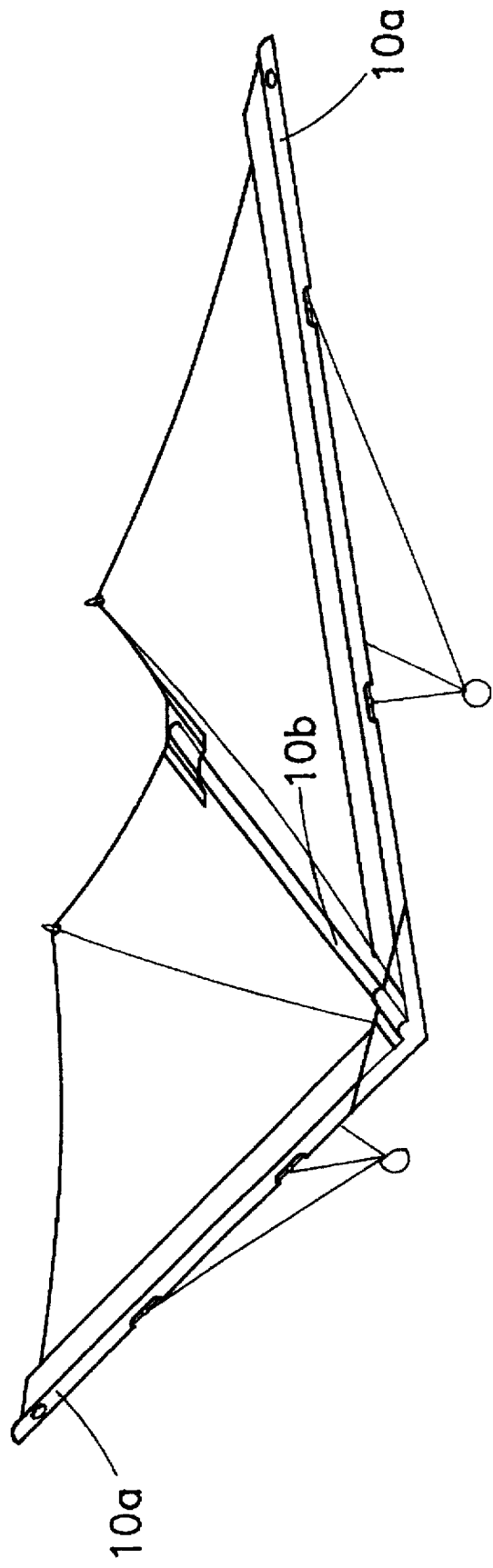
FIG. 4 is a perspective view of a kite made according to the present invention.

Referring to FIG. 4, the aforesaid shock absorbing structure can be employed to the front and rear ends of the spine 10b as well as the rear ends of the two side frame rods 10a.

Figure 5:
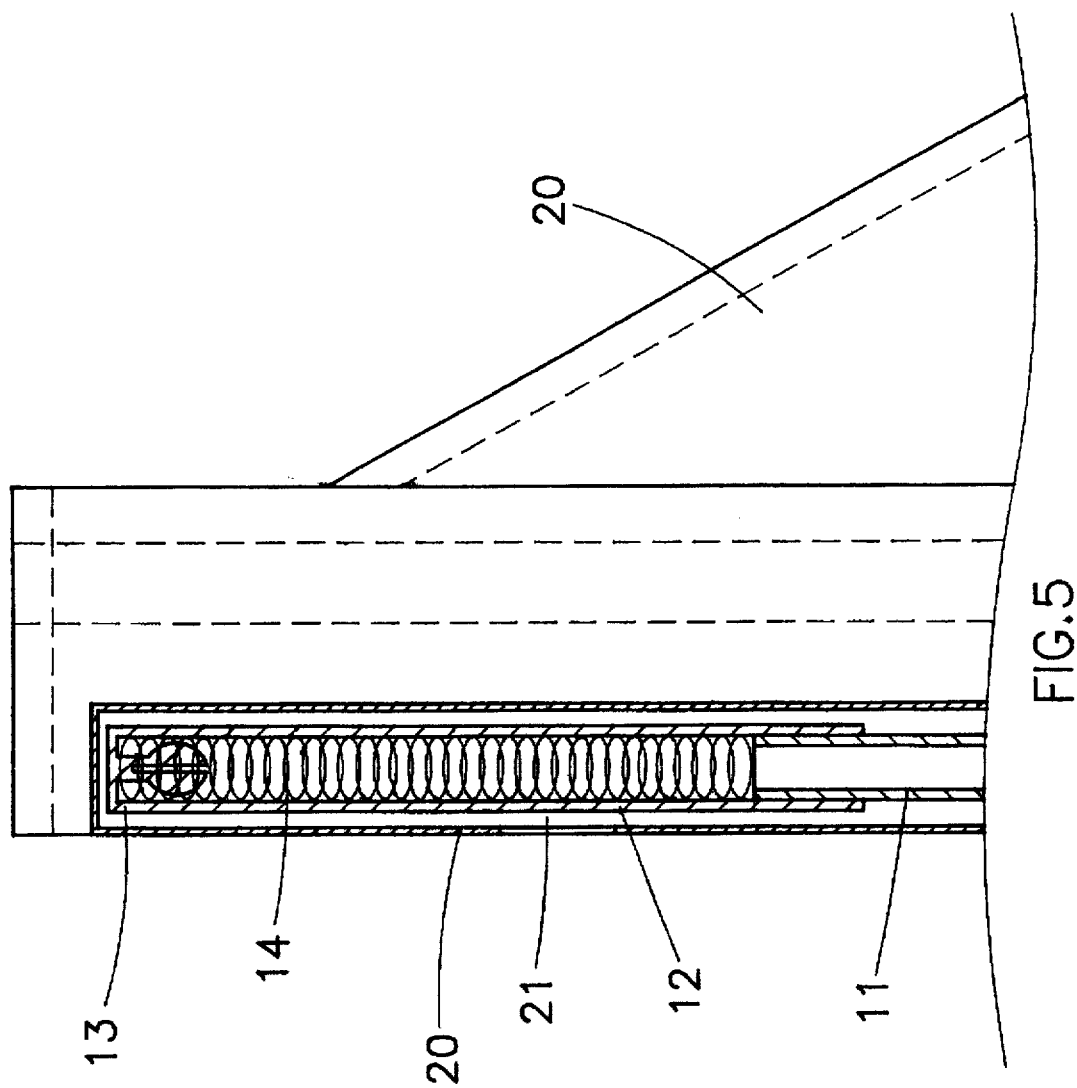
FIG. 5 is a sectional plain view of an alternate form of the shock absorbing frame structure according to the present invention.

Referring to FIG. 5, as an alternate form of the present invention, the end cap 13 and the sleeve 12 may be made in integrity having a smooth outside wall. Further, the spring 14 can be a coil spring or any of a variety of suitable springy members.

It is to be understood that the drawings are designed for purposes of illustration only, and are not intended as a definition of the limits and scope of the invention disclosed.

What the invention claimed is:

1. A shock absorbing frame structure comprising a frame rod having one end inserted into one pocket of the cover sheet of a kite, a sleeve sleeved onto one end of said frame rod, an end cap fixedly fastened to one end of said sleeve outside said frame rod and disposed within the pocket of the cover sheet of the kite, and spring means mounted within said sleeve and stopped between said end cap and said frame rod and adapted for absorbing shocks.

2. The shock absorbing frame structure of claim 1 wherein said frame rod is the spine of the framework of the kite.

3. The shock absorbing frame structure of claim 1 wherein said frame rod is one side frame rod of the framework of the kite.

4. The shock absorbing frame structure of claim 1 wherein said sleeve and said end cap are made in integrity, having a smooth outside wall.

5. The shock absorbing frame structure of claim 1 wherein said spring means is a coil spring.

* * * * *